(12) United States Patent
Patel et al.

(10) Patent No.: US 11,982,592 B2
(45) Date of Patent: May 14, 2024

(54) PORTABLE HYDROSTATIC TEST TOOL

(71) Applicant: Oceaneering International, Inc., Houston, TX (US)

(72) Inventors: Nikunj Patel, Katy, TX (US); Rosianita Balena, Niteroi (BR); Ricardo Castrioto, Teresopolis (BR); Matheus do Nascimento Santos, Teresopolis (BR); Fabio Guimaraes da Silva, Rio de Janeiro (BR); André Luiz Santana Teixeira, Rio de Janeiro (BR)

(73) Assignee: Oceaneering International, Inc., Houston, TX (US)

( * ) Notice: Subject to any disclaimer, the term of this patent is extended or adjusted under 35 U.S.C. 154(b) by 27 days.

(21) Appl. No.: 17/827,878

(22) Filed: May 30, 2022

(65) Prior Publication Data

US 2022/0390317 A1 Dec. 8, 2022

Related U.S. Application Data

(60) Provisional application No. 63/196,216, filed on Jun. 2, 2021.

(51) Int. Cl.
*G01M 3/28* (2006.01)

(52) U.S. Cl.
CPC .................. *G01M 3/2853* (2013.01)

(58) Field of Classification Search
CPC .................................................. G01M 3/2853
See application file for complete search history.

(56) References Cited

U.S. PATENT DOCUMENTS

| | | | |
|---|---|---|---|
| 6,549,857 B2 * | 4/2003 | Fierro ................. | G01M 3/2815 702/51 |
| 10,215,341 B2 * | 2/2019 | Barden .................. | F17D 5/005 |
| 2002/0040782 A1 * | 4/2002 | Rytlewski .............. | E21B 41/04 166/341 |
| 2010/0085064 A1 * | 4/2010 | Loeb ........................ | F16L 9/20 324/537 |
| 2020/0103051 A1 * | 4/2020 | Clunie .................. | E21B 43/017 |

* cited by examiner

*Primary Examiner* — David Z Huang
(74) *Attorney, Agent, or Firm* — Maze IP Law, P.C.

(57) ABSTRACT

Hydrostatic test tool 100 comprises frame 161; pressurizer 120; connection system 110; control system 130; data communicator 140; power supply 150; device handler 162; and buoyancy unit 163. Hydrostatic test tool 100 can be used to perform an in situ seal test of subsea equipment connectors with limited support from external systems, allowing optimization of subsea operations by not requiring constant support from underwater vehicle 5, which could be used to perform other tasks while the test is being carried out, optimizing the total time of support vessel 6 and reducing operational cost. Hydrostatic test tool 100 typically requires interfacing with underwater vehicle 5, e.g., an ROV or AUV, only for deployment/installation and data communication, if at all.

20 Claims, 4 Drawing Sheets

PORTABLE HYDROSTATIC TEST TOOL

RELATION TO OTHER APPLICATIONS

This application claims priority through U.S. Provisional Application 63/196,216 filed on Jun. 2, 2021.

BACKGROUND

Subsea equipment installation often requires connection between equipment (e.g., x-tree to production jumper, flowline to a pipeline end termination (PLET), etc.) and/or internal modules (manifold valve module, x-tree choke valve module, etc.), which are based on subsea connector technology. In order to ensure proper connection and avoiding leakage of fluids (e.g., hydrocarbons, chemicals, etc.) to sea, the sealing properties of subsea connectors must be verified in situ.

Currently, in situ subsea connectors seal test is performed, most of the times, with the support of a remotely operated vehicle (ROV), which pressurizes hydraulic fluid into subsea connectors' test chambers via a standard hot stab interface. The operation consists of pressurizing a small volume of fluid (3-5 liters), holding the pressure after it reaches the specified value and checking for stabilization. Due to small volume and strict acceptance criteria, this process can take up to 2 hours per connector, a period of time that the associated ROV must be standing by since it is responsible for pressure control and monitoring. In case other operations are required, such other operations are executed only after the seal test is done (if only one ROV is available), increasing the total operational time.

Thus, there is a need for a system and method to perform the required functions for the hydrostatic testing of a subsea equipment components with a limited support from other systems such as an ROV. By meeting this need, the ROV can be available to perform simultaneous activities while the test is underway, optimizing the total time of a support vessel and reducing operational cost. Further, such system could also expand the capabilities of autonomous underwater vehicles (AUVs) supporting operations of in situ seal test of subsea connectors.

FIGURES

Various figures are included herein which illustrate aspects of embodiments of the disclosed inventions.

DESCRIPTION OF EXEMPLARY EMBODIMENTS

As used herein, "subsea equipment" comprises Christmas trees, manifolds, pipeline terminations with associated connection systems, e.g., rigid jumpers, and the like, or a combination thereof. Typically, such subsea equipment comprises a hot stab receptacle.

Figure 1:
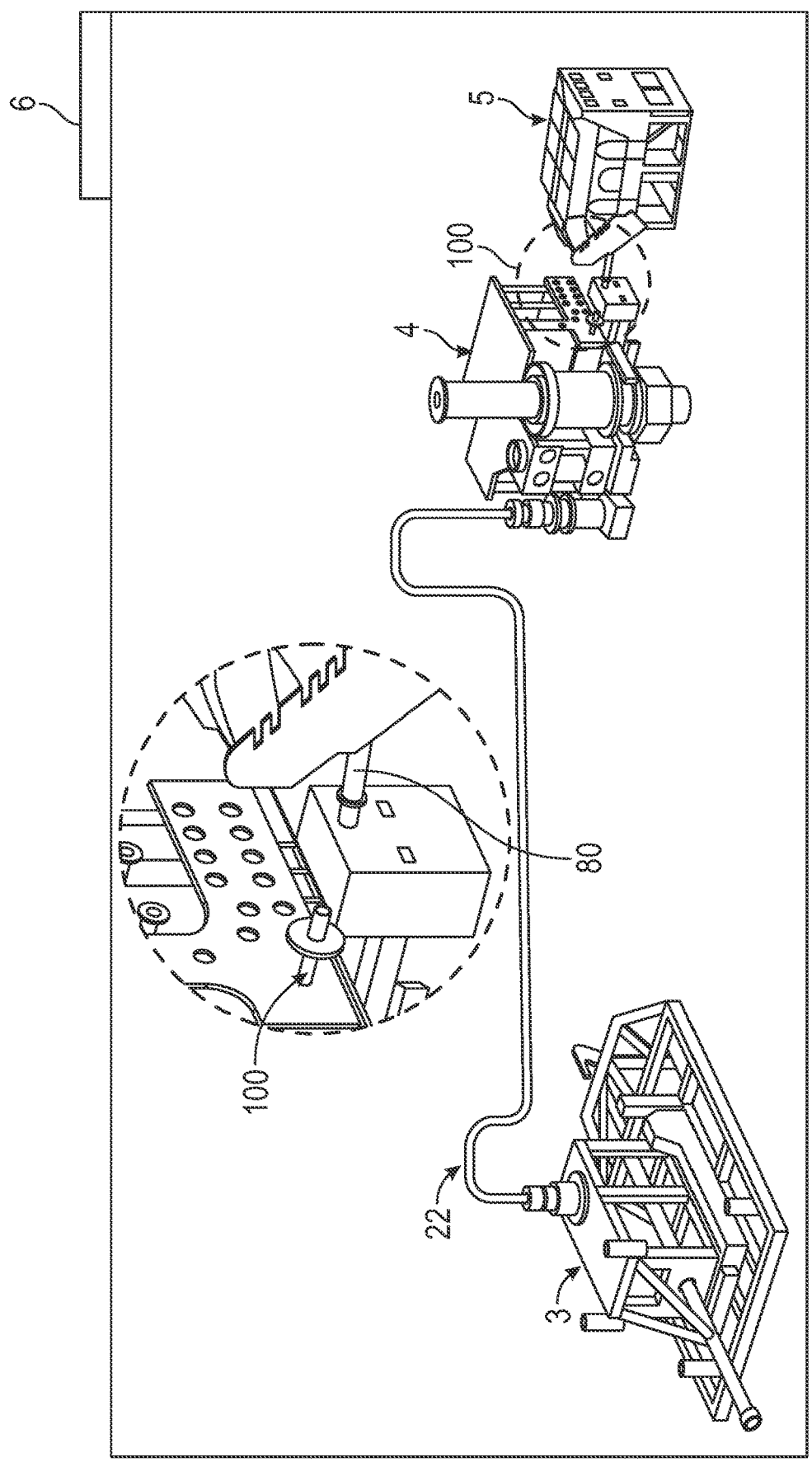
FIG. 1 is a schematic view in partial perspective of an exemplary embodiment of a system incorporating an exemplary hydrostatic test tool.
Figure 2:
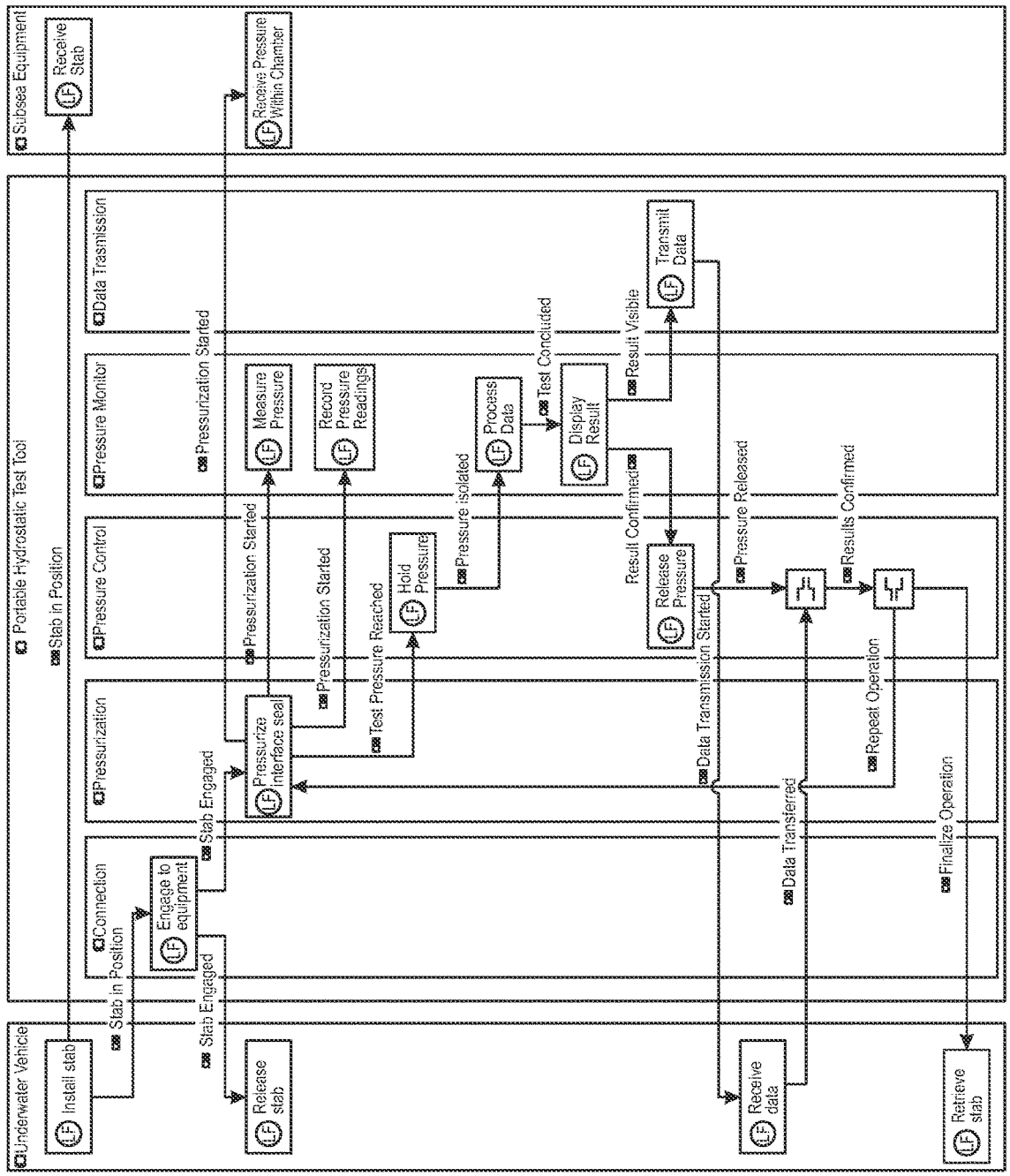
FIG. 2 is a block diagram of an exemplary system incorporating an exemplary hydrostatic test tool.

In a first embodiment, referring generally to FIG. 1, hydrostatic test tool 100 comprises frame 161; hydraulic fluid pressure conduit 22 to allow hydrostatic testing; pressurizer 120 disposed at least partially in frame 161 and in fluid communication with hydraulic fluid pressure conduit 22; connection system 110 disposed at least partially in frame 161 and adapted to interface with subsea equipment 3, where connection system 110 is in fluid communication with pressurizer 120; control system 130 disposed at least partially in frame 161 and operatively in communication with pressurizer 120 and connection system 110; data communicator 140, e.g., data transceiver 141, disposed at least partially in frame 161, typically configured for bidirectional data communications; power supply 150 disposed at least partially in frame 161 and operatively in communication with pressurizer 120, connection system 110, control system 130, and data communicator 140; device handler 162 disposed at least partially in frame 161 and adapted to interface with underwater vehicle 5; and buoyancy unit 163 disposed at least partially in frame 161 and adapted to reduce weight of hydrostatic test tool 100 in water. Although described herein in a subsea context, hydrostatic test tool 100 may be used for other than subsea use, e.g., for onshore seal testing of subsea connectors during assembly and acceptance testing.

Frame 161 typically provides physical integration for, and protects, system components and typically comprises carbon steel, aluminum, composite material, or the like, or a combination thereof.

In embodiments, pressurizer 120 generates hydraulic pressure and further comprises hydraulic pressure generator 121; pressure source interface 124 in fluid communication with hydraulic pressure generator 121; fluid reservoir 123 in fluid communication with hydraulic pressure generator 121; and a predetermined set of valves 122 which are operative to hold and release pressure and which area in fluid communication with hydraulic pressure generator 121 and fluid reservoir 123. Hydraulic pressure generator 121 may comprise an electric pump, a hydraulic pump, a pressure intensifier, an external pressure source, or the like, or a combination thereof. In addition, the predetermined set of valves 122 may comprise a manual valve, an electrically actuated valve, a solenoid valve, a hydraulically actuated valve, or the like, or a combination thereof. Typically, pressure source interface 124 comprises a hot stab interface. Fluid reservoir 123 typically comprises a bladder reservoir, a rigid reservoir, or the like, or a combination thereof.

Connection system 110 typically comprises hot stab 111.

In embodiments, control system 130 further comprises data processor 133 and one or more of pressure transducer 131, which measures hydraulic pressure, operatively in communication with data processor 133; flowmeter 132, which measures the quantity of hydraulic flow, operatively in communication with data processor 133 and which may comprise a digital flowmeter; data logger 134, which measures pressure readings, operatively in communication with data processor 133 where data logger 134 further comprises data store 136 such as a hard drive or a solid-state disk drive; and display 135 operatively in communication with data processor 133. Data processor 133 may comprise a programmable logic controller (PLC), a central processing unit, a microcontroller board, or the like, or a combination thereof. Display 135 may comprise a predetermined set of light emitting diode (LED) lights, an LED Display, or the like, or a combination thereof.

If present, data transceiver 141 may comprise an underwater acoustics data transceiver, an underwater inductive data transceiver, an underwater optics data transceiver, an underwater radio frequency data transceiver, an underwater microwave data transceiver, a regular wireless IEEE 802.11 data transceiver, or the like, or a combination thereof.

Power supply 150 provides power to components of hydrostatic test tool 100 that require power, e.g., electrical power. Power supply 150 typically comprises power source 151, e.g., a battery, an external electrical power source, or the like, or a combination thereof, and may further comprise power distributor 152.

Device handler 162 typically comprises an ROV handle or a tooling interface such as the Oceaneering International, Inc. OMNI™ tooling interface.

Buoyancy unit 163 typically comprises a predetermined set of foam blocks.

Figure 3:
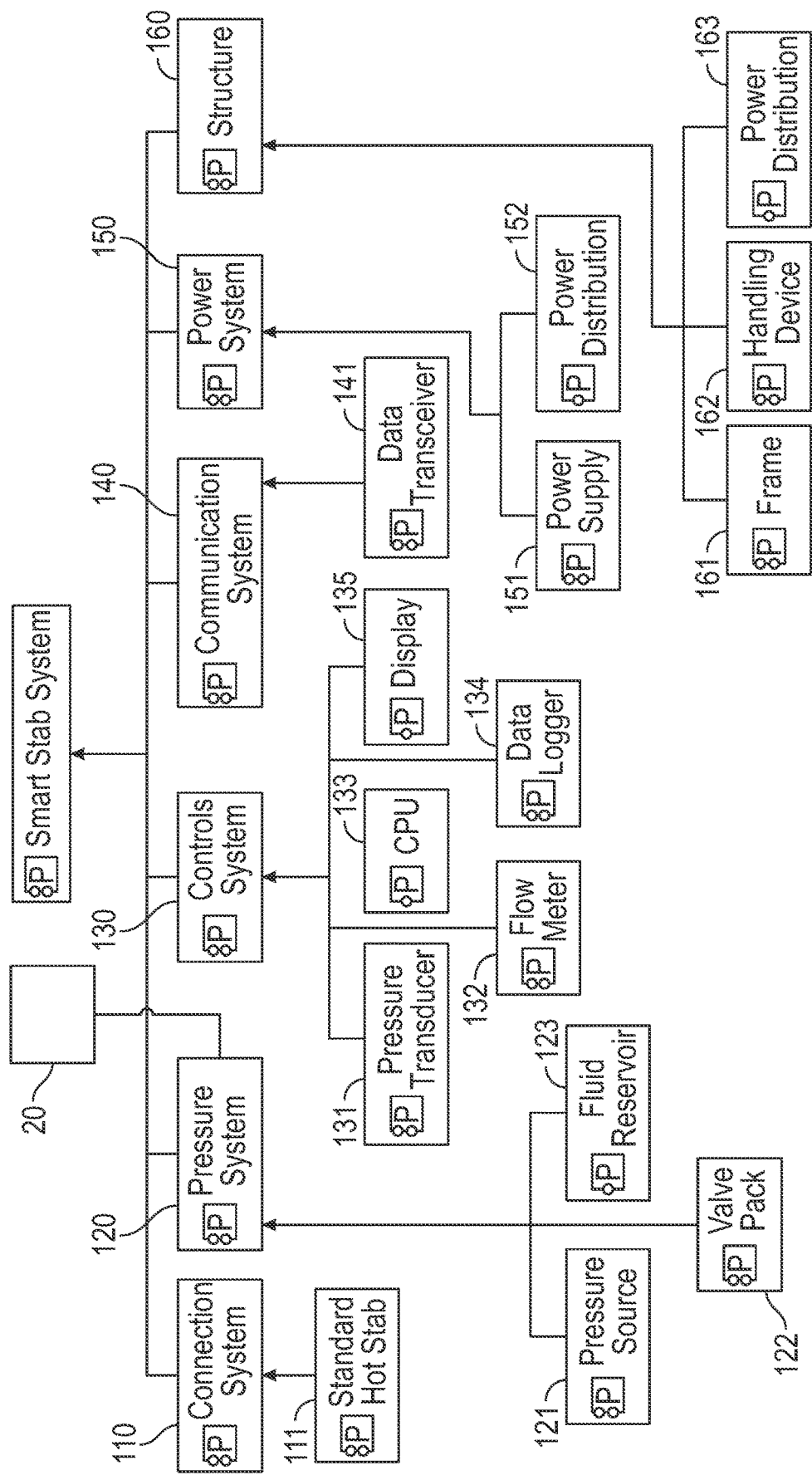
FIG. 3 is a block diagram of an exemplary hydrostatic test tool components.
Figure 4:
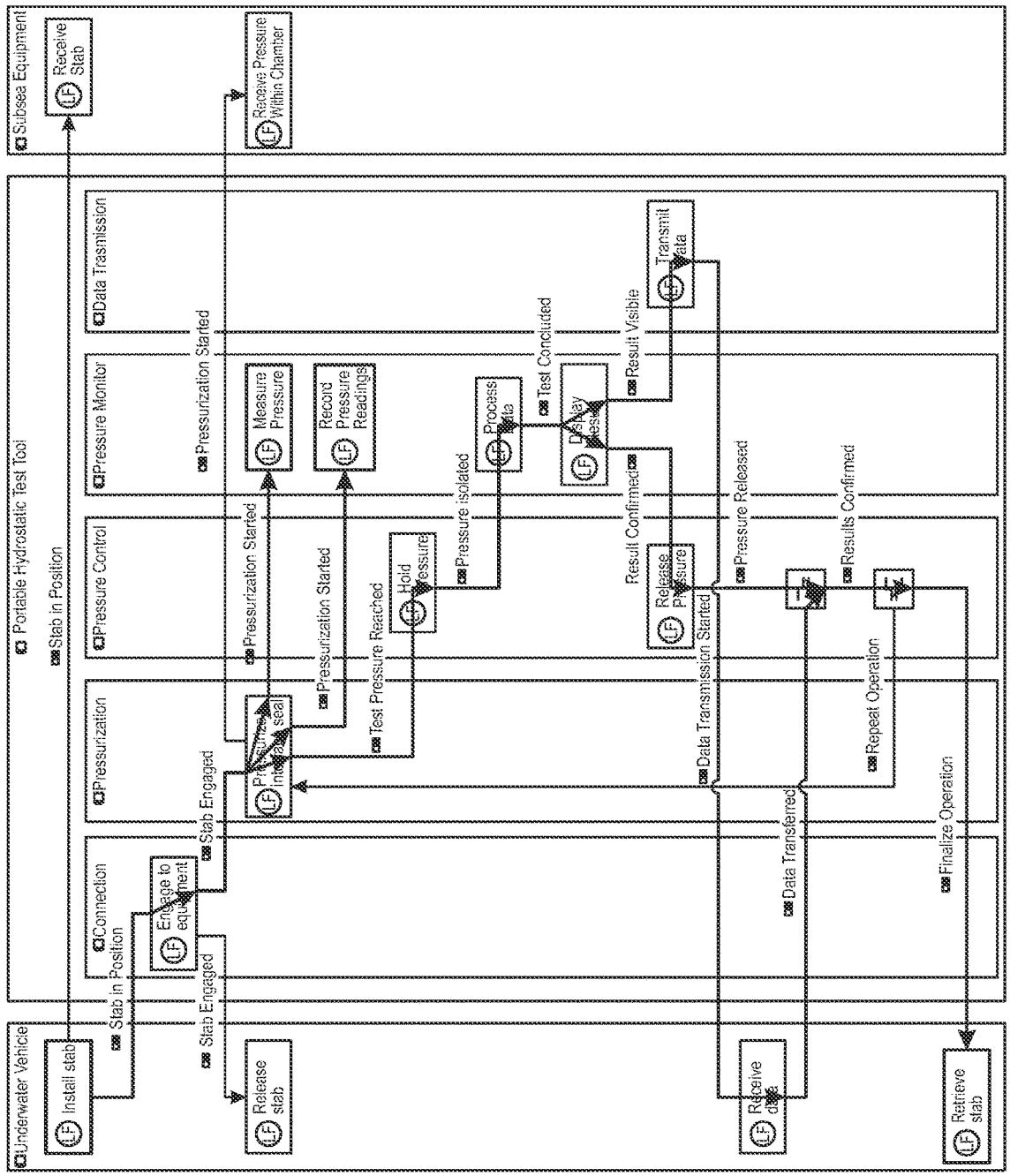
FIG. 4 is a block diagram of an exemplary hydrostatic test tool performing tests.

In certain embodiments, hydrostatic test tool 100 further comprises underwater vessel interface 20 (FIG. 3) in fluid communication with connection system 110.

In the operation of exemplary embodiments, hydrostatic test tool 100 can be used to perform an in situ seal test of subsea equipment connectors with limited support from external systems, allowing optimization of subsea operations by not requiring constant support from underwater vehicle 5, which could perform other tasks while the test is being carried out. In this manner, underwater vehicle 5 may be available to perform simultaneous activities while the test is underway, optimizing the total time of support vessel 6 and reducing operational cost. Hydrostatic test tool 100 typically requires interfacing with underwater vehicle 5, e.g., an ROV or AUV, only for deployment/installation and data communication, if at all. Underwater vehicle 5, if used, typically installs and retrieves hydrostatic test tool 100 from a hot stab receptacle on subsea equipment 3 which, in turn, receives hydraulic fluid from hydrostatic test tool 100 through the hot stab interface to pressurize a subsea connector seal test chamber. Where underwater vehicle 5 comprises an AUV, the AUV may be able to support seal tests of subsea connectors operations.

As described below, hydrostatic test tool 100 is capable of pressurizing an interface seal; controlling and monitoring pressure; and transmitting readings. Testing pressurization, holding pressure, monitoring pressure, and releasing pressure typically occur without requiring a continuous connection to underwater vehicle 5.

Hydrostatic test tool 100 is typically deployed from support vessel 6 to a predetermined subsea location, e.g., along a seafloor or at or near a predetermined water depth, and underwater vehicle 5, e.g., a remotely operated vehicle (ROV) or autonomously operated vehicle (AUV), is used to install hydrostatic test tool 100 proximate to or on a predetermined subsea equipment 3, where installing comprises engaging pressure source interface 124 into subsea equipment receptacle 4. However, deployment of hydrostatic test tool 100 from support vessel 6 to a subsea operation location may be done in multiple ways, e.g., use of a dedicated deployment basket and/or from within an ROV or AUV basket, cage, toolbox, or the like.

In embodiments, underwater vehicle 5 installs hydrostatic test tool 100 by engaging its hot stab interface 111 into a subsea equipment receptacle. Engagement of pressure source interface 124 into subsea equipment receptacle 4 is confirmed, e.g., by use of valving or sensors or the like or a combination thereof, and, once engagement is confirmed and hydrostatic test tool 100 is installed, hydrostatic test tool 100 used to perform hydrostatic testing via connection system 110 and operate independently without the continuous assistance of underwater vehicle 5. Once hydrostatic test tool 100 is installed, hydrostatic test tool 100 is capable of independently performing the hydrostatic testing of a subsea connector as well as recording and processing the test data.

The testing typically involves providing hydraulic fluid to the predetermined subsea equipment 3 from hydraulic fluid pressure conduit 22 to pressurize a subsea connector seal test chamber of subsea connector 3 under test; and, as soon as pressurization begins, using control system 130 to measure and record pressure levels and obtain a predetermined set of test data. Typically, once pressurization is started, hydrostatic test tool 100 keeps on pressurizing until a desired test pressure level is achieved and, once achieved, the desired test pressure level triggers isolation of the hydraulic pressure within the subsea connector to allow stabilization and demonstrating sealing integrity.

The predetermined set of test data are recorded in data logger 134 and storing the recorded test data in data store 136; once pressure reaches a specified level for executing the seal test, using hydrostatic test tool 100 to isolate and hold the pressure within connection system 110 to allow stabilization; continuing to monitor pressure levels over a predetermined time period; and processing the test data.

If a pressure drop rate is detected after a predetermined period of time, the pressure drop is analyzed according to a predetermined set of analysis criteria. If the pressure drop rate is lower than or equal to a predefined pressure drop rate criterion, a successful test pass status is generated. If the pressure drop rate is higher than the predefined pressure drop rate criterion, an unsuccessful test fail status is generated. Once pressure readings have been processed during the predefined period of time, the result of the test indicated to notify operations crew of the test result.

Stored data may be retrieved from hydrostatic test tool 100 using underwater vehicle 5. Moreover, underwater vehicle 5 may remain available to perform simultaneous activities while the test is underway.

If pressure source interface 124 comprises a hot stab interface, the hydraulic fluid may be provided to the predetermined subsea equipment 3 from hydraulic fluid pressure conduit 22 through the hot stab interface.

In certain embodiments, hydrostatic test tool 100 is unpressurized at the time of installation and pressurization started after pressure source interface 124 is completely engaged to the subsea equipment's receptacle.

Typically, hydrostatic test tool 100 keeps the connector pressurized until the hydrostatic test tool evaluates that the test is completed and, once the test is completed, trapped pressure from the subsea equipment is released.

Recorded test data may be transmitted to an external system, where such transmission may or may not occur subsea.

After testing, underwater vehicle 5 may retrieve hydrostatic test tool 100 from the subsea equipment receptacle and the operation finalized, after releasing the pressure and confirming the results. Alternatively, the test sequence may be repeated, in which case retrieval of hydrostatic test tool 100 is not required.

The foregoing disclosure and description of the inventions are illustrative and explanatory. Various changes in the size, shape, and materials, as well as in the details of the illustrative construction and/or an illustrative method may be made without departing from the spirit of the invention.

The invention claimed is:

1. A hydrostatic test tool, comprising:
   a. a frame;
   b. a device handler disposed at least partially in the frame and adapted to interface with an underwater vehicle;
   c. a hydraulic fluid pressure conduit;

d. a pressurizer disposed at least partially in the frame and in fluid communication with the hydraulic fluid pressure conduit;
e. a connection system disposed at least partially in the frame and adapted to interface with subsea equipment, the connection system in fluid communication with the pressurizer;
f. a control system disposed at least partially in the frame and operatively in communication with the pressurizer and the connection system, the control system adapted to measure and record pressure levels and obtain a predetermined set of test data sufficient to achieve a desired test pressure level;
g. a data communicator disposed at least partially in the frame;
h. a power supply disposed at least partially in the frame and operatively in communication with the pressurizer, the connection system, the control system, and the data communicator;
i. a buoyancy unit disposed at least partially in the frame and adapted to reduce weight of the hydrostatic test tool in water.

2. The hydrostatic test tool of claim 1, further comprising an underwater vessel interface in fluid communication with the connection system.

3. The hydrostatic test tool of claim 1, wherein the pressurizer further comprises:
a. a hydraulic pressure generator;
b. a pressure source interface in fluid communication with the hydraulic pressure generator;
c. a fluid reservoir in fluid communication with the hydraulic pressure generator; and
d. a predetermined set of valves, operative to hold and release pressure and in fluid communication with the hydraulic pressure generator and the fluid reservoir.

4. The tool of claim 3, wherein the pressure source interface comprises a hot stab interface.

5. The tool of claim 1, wherein the control system further comprises:
a. a data processor;
b. a pressure transducer operatively in communication with the data processor;
c. a flowmeter operatively in communication with the data processor;
d. a data logger operatively in communication with the data processor, the data logger comprising a data store; and
e. a display operatively in communication with the data processor.

6. The tool of claim 1, wherein the data communicator comprises a data transceiver.

7. The tool of claim 1, wherein the power supply further comprises a power distributor.

8. The tool of claim 1, wherein the frame comprises carbon steel, aluminum, or composite material.

9. The tool of claim 1, where the device handler comprises a remotely operated vehicle (ROV) handle or a tooling interface.

10. The hydrostatic test tool of claim 1, wherein the connection system comprises a hot stab.

11. A method of performing in situ seal test of a predetermined set of subsea equipment connectors without requiring constant support from an underwater vehicle using a hydrostatic test tool comprising a frame; a device handler disposed at least partially in the frame and adapted to interface with an underwater vehicle; a hydraulic fluid pressure conduit; a pressurizer disposed at least partially in the frame and in fluid communication with the hydraulic fluid pressure conduit; a connection system disposed at least partially in the frame and adapted to interface with subsea equipment, the connection system in fluid communication with the pressurizer; a control system disposed at least partially in the frame and operatively in communication with the pressurizer and the connection system, the control system adapted to measure and record pressure levels and obtain a predetermined set of test data sufficient to achieve a desired test pressure level; a data communicator disposed at least partially in the frame; a power supply disposed at least partially in the frame and operatively in communication with the pressurizer, the connection system, the control system, and the data communicator; and a buoyancy unit disposed at least partially in the frame and adapted to reduce weight of the hydrostatic test tool in water, the method comprising:
a. deploying the hydrostatic test tool from a support vessel to a predetermined subsea location;
b. using an underwater vehicle to install the hydrostatic test tool proximate to a predetermined subsea equipment, where installing comprises engaging a pressure source interface which is in fluid communication with a hydraulic pressure generator into a subsea equipment receptacle;
c. confirming engagement of the pressure source interface into the subsea equipment receptacle;
d. once the hydrostatic test tool is installed and engagement is confirmed, using the hydrostatic test tool to perform hydrostatic testing via the connection system and operate independently without the assistance of the underwater vehicle by:
  i. providing hydraulic fluid to the predetermined subsea equipment from the hydraulic fluid pressure conduit to pressurize a subsea connector seal test chamber of the subsea connector under test;
  ii. as soon as pressurization begins, using the control system to measure and record pressure levels and obtain a predetermined set of test data, the control system comprising a data logger and a data store;
  iii. recording the predetermined set of test data in the data logger and storing the recorded test data in the data store;
  iv. once pressure reaches a specified level for executing the seal test, using the hydrostatic test tool to isolate and hold the pressure within the connection system to allow stabilization;
  v. continuing to monitor pressure levels over a predetermined time period;
  vi. processing the test data;
  vii. if a pressure drop rate is detected after a predetermined period of time,
    1. analyzing the pressure drop according to a predetermined set of analysis criteria;
    2. if the pressure drop rate is lower than or equal to a predefined pressure drop rate criterion, generating a successful test pass status; and
    3. if the pressure drop rate is higher than the predefined pressure drop rate criterion, generating an unsuccessful test fail status; and
  viii. once pressure readings have been processed during the predefined period of time, indicating the result of the test to notify operations crew.

12. The method of claim 11, wherein the pressure source interface comprises a hot stab interface, the method further comprising providing the hydraulic fluid to the predetermined subsea equipment from the hydraulic fluid pressure conduit through the hot stab interface.

13. The method of claim 11, further comprising using the underwater vehicle to retrieve stored data from the hydrostatic test tool.

14. The method of claim 11, further comprising using the underwater vehicle to install and retrieve the hydrostatic test tool of claim 1 from the pressure source interface, a deployment basket, within an underwater vehicle basket, cage, or a toolbox.

15. The method of claim 11, wherein:
   a. the hydrostatic test tool is unpressurized at the time of installation; and
   b. pressurization is started after the pressure source interface is completely engaged to the subsea equipment's receptacle.

16. The method of claim 15, wherein, once pressurization is started:
   a. the hydrostatic test tool keeps on pressurizing until a desired test pressure level is achieved; and
   b. once achieved, the desired test pressure level triggers isolation of the hydraulic pressure within the subsea connector to allow stabilization and demonstrating sealing integrity.

17. The method of claim 11, wherein;
   a. the hydrostatic test tool keeps the connector pressurized until the hydrostatic test tool evaluates that the test is completed; and
   b. once the test is completed, trapped pressure from the subsea equipment is released.

18. The method of claim 11, further comprising transmitting the recorded test data to an external system.

19. The method of claim 11, further comprising using the underwater vehicle, after releasing the pressure, to retrieve the hydrostatic test tool from the subsea equipment receptacle, thereby finalizing the operation, and confirm the results.

20. The method of claim 11, further comprising allowing the underwater vehicle to remain available to perform simultaneous activities while the test is underway.

* * * * *